W. L. JACQUES.
HANDSAW.
APPLICATION FILED JULY 2, 1920.
1,381,997.
Patented June 21, 1921.
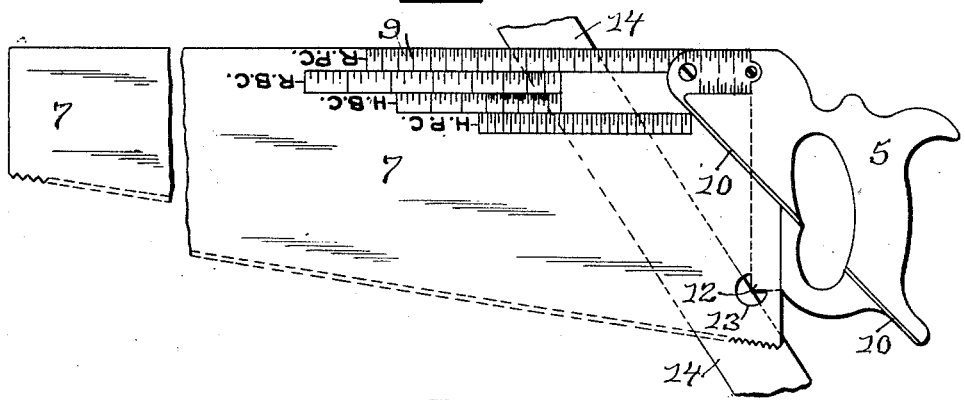
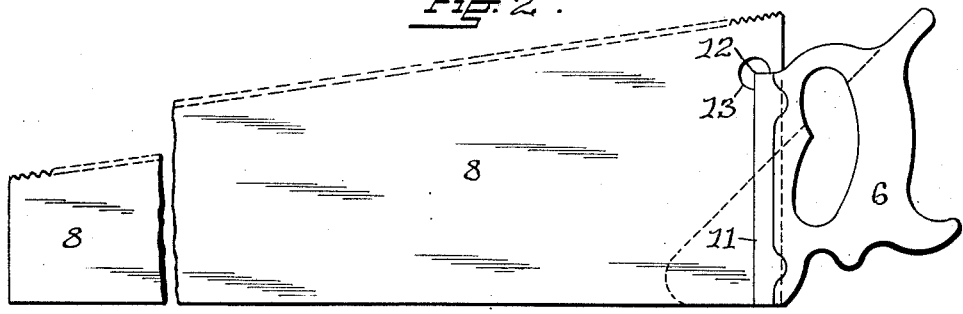
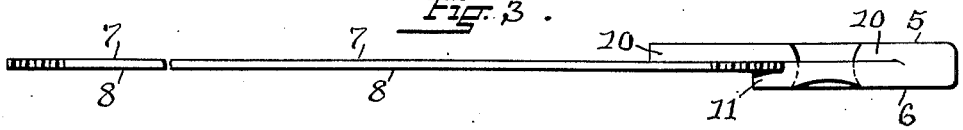
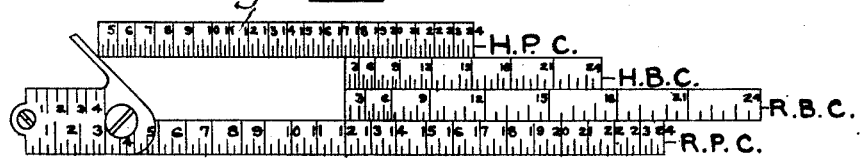
INVENTOR:
William Louis Jacques
By Chas. H. Luther
ATTORNEY:

UNITED STATES PATENT OFFICE.

WILLIAM LOUIS JACQUES, OF CENTRAL FALLS, RHODE ISLAND.

HANDSAW.

1,381,997.      Specification of Letters Patent.      Patented June 21, 1921.

Application filed July 2, 1920. Serial No. 393,563.

*To all whom it may concern:*

Be it known that I, WILLIAM LOUIS JACQUES, a citizen of the United States, residing at Central Falls, in the county of Providence and State of Rhode Island, have invented a new and useful Improvement in Handsaws, of which the following is a specification.

My invention has reference to an improvement in saws and more particularly to an improvement in handsaws for sawing wood.

The object of my invention is to improve the construction of a carpenter's handsaw whereby the saw may be used as a saw, a try-square and bevel, as a scale to determine hip plum and bevel cut and the degrees of a pitch and plum cut to rafters.

My invention consists in the peculiar and novel construction of a handsaw, said handsaw having details of construction, as will be more fully set forth hereinafter and claimed.

Figure 1 is a left-hand side view of my improved handsaw showing the handle constructed to form a raised edge at an angle of forty-five degrees with the back of the saw;

Fig. 2 is a right-hand side view of the saw showing the corner of the right-angle raised heel on the handle, at the center of the sight opening, so that the corner can be seen through the sight opening from the left-hand side of the saw blade;

Fig. 3 is an under edge view of the saw; and

Fig. 4 is an enlarged detail view of the scale on the left-hand side of the saw blade.

In the drawing 5 indicates the left-hand side and 6 the right-hand side of the handle, 7 indicates the left-hand side and 8 the right-hand side of the saw blade, and 9 indicates a scale, as indicated in Fig. 1 and shown in Fig. 4. The left-hand side 5 of the handle has a beveled edge 10, which extends across the entire handle and onto the saw blade at an angle of forty-five degrees to the back of the saw blade. The right-hand side 6 of the handle has a raised edge 11 at right angles to the back of the saw blade and a corner 12, as shown in Fig. 2, and which is easily seen at the left-hand side of the saw blade through a sight opening 13 in the saw blade, as shown in Fig. 1. The scale 9 is for indicating plum cut, side cut, or pitch of rafters for hips or valleys for rises from one inch to twenty-four inches. That part of the scale indicated by the letters H. P. C. is used for a hip cut, that part of the scale indicated by the letters H. B. C is used for a hip bevel cut, that part of the scale indicated by the letters R. B. C. is used for a rafter bevel cut, and that part of the scale indicated by the letters R. P. C. is used for a rafter plum cut.

In the use of my improved handsaw for obtaining the required angle on a rafter 14 the saw blade 7 is laid on the rafter right-hand side down with the corner 12 of the handle against the edge of the rafter. The corner 12 and the edge of the rafter are now easily seen through the sight opening 13, as shown in Fig. 1. If the rafter is to be plum cut, the saw blade is moved on the rafter, with the corner 12 of the handle against the edge of the rafter, until the required angle is indicated by the part R. P. C. of the scale. The angle of the plum cut now being obtained it is marked on the rafter by a pencil along the straight back of the saw blade. The hip plum cut, hip bevel cut, and rafter bevel cut are obtained in the same way, using the parts of the scale indicated for these purposes.

By this construction my improved carpenter's saw is used not only as a handsaw but also as a carpenter's try-square and as a bevel, and the scale is extremely useful for computing the pitch to rafters and as a measuring and calculating tool to give the lengths required of rafters and hips, all in one convenient and useful carpenter's tool.

Having thus described my invention I claim as new:—

1. A handsaw having a blade with a sight opening, a handle on the blade, said handle having on one side a raised angular ledge which extends entirely across the handle and onto the saw blade, and on the other side a raised right-angular ledge with a corner which extends to the center of the sight opening, for the purpose as described.

2. A handsaw having a blade with a sight opening, a handle on the blade and having a corner extending to the center of the sight opening, a scale on the blade, said scale comprising a hip plum cut scale, a hip bevel cut scale, a rafter bevel cut scale, and a rafter plum cut scale, all as shown and for the purpose as described.

In testimony whereof, I have signed my name to this specification.

WILLIAM LOUIS JACQUES.